US010900869B2

(12) United States Patent
Fishkin et al.

(10) Patent No.: US 10,900,869 B2
(45) Date of Patent: Jan. 26, 2021

(54) DETECTION OF BEARING CARBONIZATION FAILURE IN TURBINE SYSTEMS

(71) Applicant: Siemens Aktiengesellschaft, Munich (DE)

(72) Inventors: Alexey Fishkin, Munich (DE); Anthony Latimer, Lincoln (GB); Mikhail Roshchin, Munich (DE); Andrew Seamer, Lincoln (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 359 days.

(21) Appl. No.: 16/075,729

(22) PCT Filed: Jan. 18, 2017

(86) PCT No.: PCT/EP2017/050921
§ 371 (c)(1),
(2) Date: Aug. 6, 2018

(87) PCT Pub. No.: WO2017/137219
PCT Pub. Date: Aug. 17, 2017

(65) Prior Publication Data
US 2019/0049339 A1 Feb. 14, 2019

(30) Foreign Application Priority Data
Feb. 9, 2016 (EP) .................................. 16154820

(51) Int. Cl.
*G01M 13/04* (2019.01)
*G01M 15/14* (2006.01)
(52) U.S. Cl.
CPC ............ *G01M 13/04* (2013.01); *G01M 15/14* (2013.01)

(58) Field of Classification Search
CPC .......... G01M 3/04; G01M 3/045; G01M 5/14
See application file for complete search history.

(56) References Cited

U.S. PATENT DOCUMENTS

2014/0157773 A1   6/2014   Matthews et al.

FOREIGN PATENT DOCUMENTS

| CN | 102997872 A | 3/2013 | |
| EP | 1211500 A1 * | 6/2002 | ............ F16C 19/525 |

(Continued)

OTHER PUBLICATIONS

Pingying, Guo et al; "Analysis of carbonized friction vibration of steam turbine high pressure rotor bearing oil"; Thermal power generation; Issue 10; pp. 83-86; 2008; English abstract on p. 4.

(Continued)

*Primary Examiner* — Manuel L Barbee

(57) ABSTRACT

A method of detecting a bearing carbonization failure in a turbine system, the turbine system has a bearing, a turbine rotational speed sensor, and a bearing displacement acceleration sensor. The method includes obtaining individual measurement values from each of the turbine rotational speed sensor and the bearing displacement acceleration sensor, determining, as a first condition, whether the measurement values from the rotational speed sensor exceed or equal a first threshold value during a first period of time, calculating a characteristic value based on the measurement values from the bearing displacement acceleration sensor corresponding to a second period of time, the second period of time being part of the first period of time, determining, as a second condition, whether the calculated characteristic value exceeds a second threshold value, and determining that a bearing carbonization failure has occurred if both the first condition and the second condition are fulfilled.

19 Claims, 2 Drawing Sheets

(56) References Cited

FOREIGN PATENT DOCUMENTS

| | | | |
|---|---|---|---|
| EP | 1211500 | A1 | 6/2002 |
| RU | 2371695 | C1 | 10/2009 |
| RU | 2376564 | C1 | 12/2009 |

OTHER PUBLICATIONS

EP Search Report dated Aug. 22, 2016, for EP patent application No. 16154820.1.
International Search Report dated Apr. 24, 2017, for PCT/EP2017/050921.

* cited by examiner

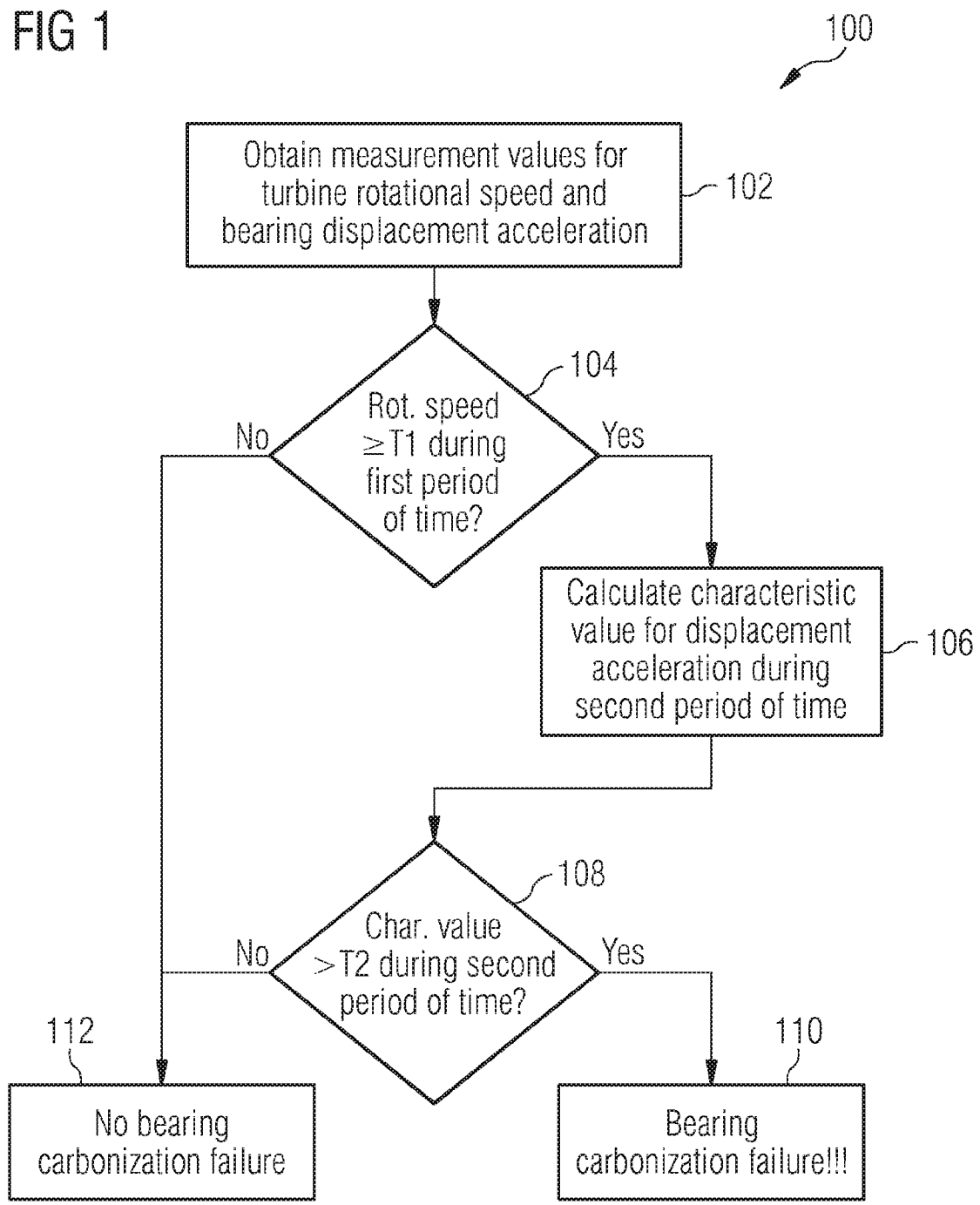

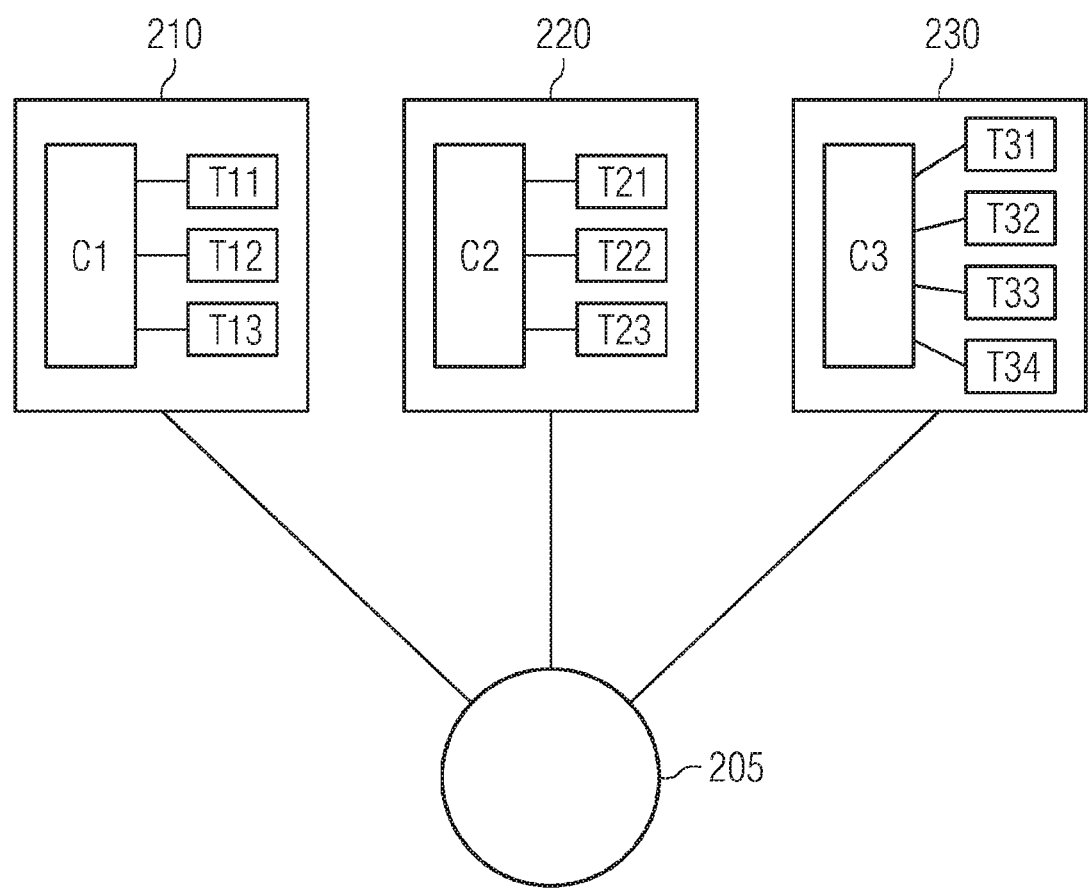

DETECTION OF BEARING CARBONIZATION FAILURE IN TURBINE SYSTEMS

CROSS REFERENCE TO RELATED APPLICATIONS

This application is the US National Stage of International Application No. PCT/EP2017/050921 filed Jan. 18, 2017, and claims the benefit thereof. The International Application claims the benefit of European Application No. EP16154820 filed Feb. 9, 2016. All of the applications are incorporated by reference herein in their entirety.

FIELD OF INVENTION

The present invention relates to the field of monitoring and failure detection in turbine systems, in particular detection of bearing carbonization failures in gas/steam turbine systems.

ART BACKGROUND

A typical gas turbine has two bearings: a front bearing (radial and thrust bearing) and a rear bearing (radial bearing). These bearings can fail due to the so-called oil carbonization. The main damage occurs to the shaft seal ring and grooves, bearing and bearing housing oil drain cavity blockage. Carbon build-up can e.g. be caused by hot shutdown of engine, degraded oil quality carbonizing in service, infrequent oil change intervals causing oil breakdown in service, air and gas leaks, and faulty fuel injector pump/injectors.

The bearing carbonization (BRC) is one of the most frequent and dangerous turbine failures. Unfortunately, one can only detect it by a direct inspection of the bearings. So, if there is either a turbine trip (i.e., an abnormal turbine shutdown) or a normal turbine stop (e.g. for maintenance), the monitoring engineer always checks whether indicators of BRC can be seen.

Any gas/steam turbine is instrumented with a large number of sensors which register a number of important physical parameters, e.g., turbine speed, bearing temperatures and displacements. The registered parameter values are used by the turbine control system.

Using the turbine data, i.e., the parameter values and the events from the control system, a service engineer monitors the turbine performance. So, in handling a turbine trip (abnormal turbine shutdown), his primary task is to figure out the failure mode (e.g., bearing carbonization), then eliminate the root-cause (e.g., clean bearings) and start the turbine again as soon as possible (e.g., minimizing the outage hours).

In order to determine a BRC failure or indications thereof, the engineer may proceed in two ways: He can either examine the graph of bearing displacements to see whether there are some sudden jumps in the displacement, or he can check the sequence of events from the control system written right before the turbine trip/stop to see whether there is an event indicating "BRC failure". However, the monitoring engineer is typically responsible for a number of turbines, such as 20 turbines or more. Furthermore, these turbines can be from different vendors, i.e., there may be different "event text" messages meaning the "BRC failure". Furthermore, the control system may either not report the BRC failures in general or may only recognize some vibrations, e.g. "heavy displacements", which cause a turbine trip. Unfortunately, control systems do not provide any standard "early indicators" for BRC failures.

Thus, there is a need for a simple and fast way of detecting bearing carbonization failures in turbine systems.

SUMMARY OF THE INVENTION

This need may be met by the subject matter according to the independent claims. Advantageous embodiments of the present invention are described by the dependent claims.

According to a first aspect of the invention there is provided a method of detecting a bearing carbonization failure (i.e. a bearing failure caused by oil carbonization) in a turbine system, the turbine system comprising a bearing, a turbine rotational speed sensor, and a bearing displacement acceleration sensor. The method comprises (a) obtaining individual measurement values from each of the turbine rotational speed sensor and the bearing displacement acceleration sensor, (b) determining, as a first condition, whether the measurement values from the rotational speed sensor exceed or equal a first threshold value during a first period of time, (c) calculating a characteristic value based on the measurement values from the bearing displacement acceleration sensor corresponding to a second period of time, the second period of time being part of the first period of time, (d) determining, as a second condition, whether the calculated characteristic value exceeds a second threshold value, and (e) determining that a bearing carbonization failure has occurred if both the first condition and the second condition are fulfilled.

This aspect of the invention is based on the idea that a bearing carbonization failure is detected by determining whether two conditions relating to measurement values from sensors in the turbine system are met. As the first condition, it is determined whether the turbine rotational speed exceeds or equals a first threshold during a first period of time, i.e. whether the rotational speed has been at least equal to the first threshold during the first period of time. As the second condition, it is determined whether a characteristic value, which is calculated on the basis of the measurement values from the bearing displacement acceleration sensor during a second period of time, exceeds a second threshold value. The second period of time is part (i.e. a subset) of the first period of time. Thus, the second period of time may be equal to the first period of time or it may be a shorter period of time within the first period of time.

In other words, with regard to the first condition it is determined whether the turbine system has been running with a certain minimum rotational speed during the first period of time. Thus, it is determined whether the turbine system has been operating on a certain level, e.g. steady state, for a certain amount (first period) of time.

The second condition relates to the behavior of the bearing displacement acceleration during a second period of time (within the first period of time). More specifically, it is determined whether a characteristic value, which relates to this behavior, exceeds the second threshold value.

Then, if both conditions are fulfilled, it is determined that a carbonization failure has occurred in the bearing.

The method according to this aspect of the invention relies on measurement data that are already provided by any turbine system (for use in corresponding control systems) and can thus be carried out without the need for any additional measurement hardware or other modifications of the turbine system itself.

According to an embodiment of the invention, the characteristic value is calculated by applying a predetermined function, in particular a statistical function, to the measurement values from the bearing displacement acceleration sensor corresponding to the second period of time.

By applying a predetermined function to the measurement values, the characteristic value may be indicative for the behavior of the measurement values over time.

According to a further embodiment of the invention, the predetermined function is selected from the group consisting of a standard deviation of the measurement values during the second period of time, an average of the measurement values during the second period of time, an exponential average of the measurement values during the second period of time, and an integral of the measurement values during the second period of time.

By calculating the standard deviation of the measurement values corresponding to the second period of time, the characteristic value is indicative of the degree of variation of the measurement values from the bearing displacement acceleration sensor.

Likewise, the average, exponential average and (Riemann) integral of the measurement values characterize the behavior of the measurement values during the second period of time.

According to a further embodiment of the invention, the predetermined function is a difference between the largest measurement value and the smallest measurement value from the bearing displacement acceleration sensor during the second period of time.

In this embodiment, the characteristic value is indicative of the actual span or bandwidth of the measurement values during the second period of time. Thus, a large characteristic value indicates that significant changes in the displacement acceleration have occurred during the second period of time.

According to a further embodiment of the invention, the turbine system further comprises a further bearing displacement acceleration sensor, and the method further comprises (a) obtaining measurement values from the further bearing displacement acceleration sensor, (b) calculating a further characteristic value based on the measurement values from the further bearing displacement acceleration sensor corresponding to the second period of time, (c) determining, as a third condition, whether the calculated characteristic value exceeds a third threshold value, and (d) determining that a bearing carbonization failure has occurred if both the first condition and the third condition are fulfilled.

In this embodiment, a third condition similar to the second condition but based on measurement values from the further bearing displacement acceleration sensor is introduced. In this embodiment, occurrence of a bearing carbonization failure is determined if the first condition and either of the second and third conditions are met.

According to a further embodiment of the invention, the bearing displacement acceleration sensor and the further bearing displacement acceleration sensor measure displacement acceleration of the bearing in respective orthogonal directions.

In this embodiment, the bearing displacement acceleration sensors measure displacement acceleration in the same bearing but in different (orthogonal) directions.

According to a further embodiment of the invention, the turbine system comprises a further bearing. The bearing displacement acceleration sensor measures displacement acceleration of the bearing, and the further bearing displacement acceleration sensor measures displacement acceleration of the further bearing.

In this embodiment, the bearing displacement acceleration sensors measure displacement acceleration in different bearings within the same turbine system.

According to a further embodiment of the invention, the duration of the first period of time is at least 30 minutes, and the duration of the second period of time is at least 10 minutes, in particular around 20 minutes.

Extensive experiments have shown that a duration of the first period of at least 30 minutes assures that the turbine system is in a stable state where no sudden changes in the bearing displacement acceleration(s) are to be expected under normal (fault free) conditions. Furthermore, a duration of the second period of time of around 20 minutes have shown to provide a good trade-off between false alarms and false negatives.

Both the first time period and second time period may in particular constitute so-called moving windows in the sense that the method is performed at regular intervals (for example every minute or every 5 minutes) and that the last x minutes of measurement values preceding the time of performing the method are used.

According to a further embodiment of the invention, the first period of time and the second period of time end at the same time.

In other words, if the first period of time is the last x minutes, then the second period of time is the last y minutes, where $y <= x$.

According to a second aspect of the invention, a device for detecting a bearing carbonization failure in a turbine system is provided, the turbine system comprising a bearing, a turbine rotational speed sensor, and a bearing displacement acceleration sensor. The device comprises (a) a unit for obtaining individual measurement values from each of the turbine rotational speed sensor and the bearing displacement acceleration sensor, (b) a unit for determining, as a first condition, whether the measurement values from the rotational speed sensor exceed or equal a first threshold value during a first period of time, (c) a unit for calculating a characteristic value based on the measurement values from the bearing displacement acceleration sensor corresponding to a second period of time, the second period of time being part of the first period of time, (d) a unit for determining, as a second condition, whether the calculated characteristic value exceeds a second threshold value, and (e) a unit for determining that a bearing carbonization failure has occurred if both the first condition and the second condition are fulfilled.

This aspect of the invention is based on the same idea as the first aspect described above and provides a device capable of performing the methods according to the first aspect and the above embodiments thereof.

According to a third aspect of the invention, there is provided a system for monitoring a plurality of turbine systems, each turbine system comprising a bearing, a turbine rotational speed sensor, and a bearing displacement acceleration sensor. The system comprising (a) a communication unit for receiving measurement values from the turbine rotational speed sensor and bearing displacement acceleration sensor of each turbine system, (b) a storage unit for storing the received measurement values, and (c) a processing unit for performing the method according to the first aspect or any of the above embodiments on the stored data for each turbine system.

This aspect of the invention is based on the idea that the simple method of detecting bearing carbonization failure according to the first aspect may be used in a system for monitoring several turbine systems.

The measurement values from each of the turbine systems are received via a communication unit (e.g. a communication network) and stored in a storage unit for processing by a processing unit.

It is noted that the system according to this aspect of the invention may be implemented at a plant with several turbine systems or at a remote location. In both cases, it may collect measurement data from several plants.

According to an embodiment of the invention, the system further comprises (a) a notification unit transmitting a notification message to an operator of a turbine system if the processing unit has detected a bearing carbonization failure in the turbine system.

In this embodiment of the invention, the notification unit transmits a notification message to the operator of the relevant turbine system in case of bearing carbonization failure, such that the operator can take the necessary action.

Preferably, the notification message may contain various information, such as a turbine ID, a bearing ID, the time of detecting the error, etc.

According to a fourth aspect of the invention, there is provided a computer program comprising computer executable instructions, which, when executed by a computer, causes the computer to perform the steps of the method according to the first aspect or any of the above embodiments.

The computer program may be installed on a suitable computer system to enable performance of the methods described above.

According to a fifth aspect of the invention, there is provided a computer program product comprising a computer readable data carrier loaded with the computer program according to the fourth aspect.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of the present invention are apparent from the examples of embodiments to be described hereinafter and are explained with reference to the examples of embodiments. The invention will be described in more detail hereinafter with reference to examples of embodiments. However, it is explicitly noted that the invention is not limited to the described exemplary embodiments.

BRIEF DESCRIPTION OF THE DRAWING

FIG. 1 shows a flowchart of a method according to an embodiment of the invention.

FIG. 2 shows a block diagram of a monitoring system according to an embodiment of the invention.

DETAILED DESCRIPTION

The illustration in the drawing is schematic. It is noted that in different figures, similar or identical elements are provided with the same reference numerals or with reference numerals which differ only within the first digit.

FIG. 1 shows a flowchart of a method 100 of detecting a bearing carbonization failure (i.e. a bearing failure caused by lubricant oil carbonization) in a turbine system according to an embodiment of the invention. More specifically, the turbine system, i.e. a gas/steam turbine, comprises at least one bearing, a turbine rotational speed sensor, and at least one bearing displacement acceleration sensor.

The method 100 begins at step 102 where individual measurement values from each of the turbine rotational speed sensor and the bearing displacement acceleration sensor are obtained. The measurement values from each single sensor typically have the form of a series of measurement values (or samples) separated in time by a predetermined amount, such as 1 second or 1 minute.

At step 104, it is determined, as a first condition, whether the measurement values from the rotational speed sensor exceed or equal a first threshold value, such as 9000 rpm, during a first period of time, such as the last 30 minutes of operation. In other words, the first condition is fulfilled if the turbine has been operating in steady state with a rotational speed equal to or above the first threshold during the first period of time. If the first condition is not fulfilled, the method continues to step 112 where it is determined that no bearing carbonization failure has occurred. If the first condition is fulfilled, the method continues to step 106.

At step 106, a characteristic value is calculated on the basis of the measurement values from the bearing displacement acceleration sensor during a second period of time. The second period of time is part of the first period of time, such as the last 10 or 20 minutes of operation. The characteristic value is indicative of the behavior of the displacement acceleration during the second period of time. In particular, the characteristic value may be calculated as the standard deviation, average, exponential average or integral of the measurement values during the second period of time or as the difference between the largest measurement value and the smallest measurement value during the second period of time.

Then, at step 108, it is determined, as a second condition, whether the calculated characteristic value exceeds a second threshold value, such as 5 mm/s$^2$. If the second condition is not fulfilled, the method continues to step 112 where it is determined that no bearing carbonization failure has occurred. If the second condition is fulfilled, the method continues to step 110 where it is determined that a bearing carbonization failure has occurred. In the latter case, appropriate measures are taken to notify the operator of the turbine system of the failure, e.g. by activating an alarm, sending a message, or in any other suitable manner.

Preferably, the method 100 is repeated at a later stage, such as after 1 minute, 3 minutes, 5 minutes or 10 minutes, as part of a continuous monitoring of the turbine system.

It should be noted that various modifications of the method 100 are possible. In particular, the second condition may be checked simultaneously with the first condition. Furthermore, further conditions relating to similar characteristic values for further displacement acceleration sensors may be added. Such further displacement acceleration sensors may in particular be configured to measure displacement acceleration in other directions and/or for further bearings. Furthermore, the method 100, whether modified or not, may of course be carried out in parallel or sequence for any number of turbines.

FIG. 2 shows a block diagram of a monitoring system according to an embodiment of the invention. The shown system comprises a monitoring device (or monitoring station) 205, a first turbine plant 210, a second turbine plant 220, and a third turbine plant 230. The first turbine plant comprises a controller C1 and three turbine systems T11, T12 and T13. The controller C1 is in communication with the turbines T11, T12 and T13 and receives measurement values from a turbine rotational speed sensor and at least one bearing displacement acceleration sensor in each turbine T11, T12, T13 and transmits control signals to the turbines T11, T12 and T13. Similarly, the second turbine plant 220 comprises a controller C2 and three turbine systems T21, T22 and T23, and the third turbine plant 230 comprises a controller C3 and four turbine systems T31, T32, T33, and T34. As a general note, more turbine plants may be added and the number of turbine systems per plant may vary from what is shown in FIG. 2.

The device 205 is in communication with each of the turbine plants 210, 220 and 230 via a communication unit, such as a network interface, and receives the measurement values collected by the respective controllers C1, C2 and C3, advantageously in a continuous manner. The received measurement values are stored in a suitable storage unit and processed in accordance with the method described above in conjunction with FIG. 1. If the processing reveals that a bearing carbonization failure has occurred in one of the turbine systems T11, T12, T13, T21, T22, T23, T31, T32, T33, T34, a notification unit transmits a corresponding notification message to the operator of the relevant turbine plant 210, 220, 230, such that proper action can be taken, i.e. cleaning the carbonized bearing.

Accordingly, the plant operator can rely on being notified in case of a bearing carbonization failure in one of the plant turbines. Thereby, the cumbersome labor associated with the study of printed bearing displacement curves or unreliable messages from the controllers C1, C2, C3 is no longer necessary and serious damage to the turbines can be prevented.

It is noted that the term "comprising" does not exclude other elements or steps and the use of the articles "a" or "an" does not exclude a plurality. Also elements described in association with different embodiments may be combined. It is further noted that reference signs in the claims are not to be construed as limiting the scope of the claims.

LIST OF REFERENCE NUMERALS

100 Method
102 Method step
104 Method step
106 Method step
108 Method step
110 Method step
112 Method step
114 Method step
116 Method step
118 Method step
205 Monitoring device
210 Turbine plant
220 Turbine plant
230 Turbine plant

The invention claimed is:

1. A method of detecting a bearing carbonization failure in a turbine system, the turbine system comprising a bearing, a turbine rotational speed sensor, and a bearing displacement acceleration sensor, the method comprising:

obtaining individual measurement values from each of the turbine rotational speed sensor and the bearing displacement acceleration sensor,
determining, as a first condition, whether the measurement values from the rotational speed sensor exceed or equal a first threshold value during a first period of time,
calculating a characteristic value based on the measurement values from the bearing displacement acceleration sensor corresponding to a second period of time, the second period of time being part of the first period of time,
determining, as a second condition, whether the calculated characteristic value exceeds a second threshold value, and
determining that a bearing carbonization failure has occurred if both the first condition and the second condition are fulfilled.

2. The method according to claim 1,
wherein the characteristic value is calculated by applying a predetermined function to the measurement values from the bearing displacement acceleration sensor corresponding to the second period of time.

3. The method according to claim 2,
wherein the predetermined function is selected from the group consisting of a standard deviation of the measurement values during the second period of time, an average of the measurement values during the second period of time, an exponential average of the measurement values during the second period of time, and an integral of the measurement values during the second period of time.

4. The method according to claim 2,
wherein the predetermined function is a difference between the largest measurement value and the smallest measurement value from the bearing displacement acceleration sensor during the second period of time.

5. The method according to claim 1, wherein the turbine system further comprises a further bearing displacement acceleration sensor, the method further comprising:
obtaining measurement values from the further bearing displacement acceleration sensor,
calculating a further characteristic value based on the measurement values from the further bearing displacement acceleration sensor corresponding to the second period of time,
determining, as a third condition, whether the calculated characteristic value exceeds a third threshold value, and
determining that a bearing carbonization failure has occurred if both the first condition and the third condition are fulfilled.

6. The method according to claim 5,
wherein the bearing displacement acceleration sensor and the further bearing displacement acceleration sensor measure displacement acceleration of the bearing in respective orthogonal directions.

7. The method according to claim 5,
wherein the turbine system comprises a further bearing, wherein the bearing displacement acceleration sensor measures displacement acceleration of the bearing, and wherein the further bearing displacement acceleration sensor measures displacement acceleration of the further bearing.

8. The method according to claim 1,
wherein the duration of the first period of time is at least 30 minutes, and wherein the duration of the second period of time is at least 10 minutes.

9. The method according to claim 1,
wherein the first period of time and the second period of time end at the same time.

10. A system for monitoring a plurality of turbine systems, each turbine system comprising a bearing, a turbine rotational speed sensor, and a bearing displacement acceleration sensor, the system comprising:
a communication unit for receiving measurement values from the turbine rotational speed sensor and bearing displacement acceleration sensor of each turbine system,
a storage unit for storing the received measurement values, and
a processing unit for performing the method according to claim 1 on the stored data for each turbine system.

11. The system according to claim 10, further comprising:
a notification unit transmitting a notification message to an operator of a turbine system if the processing unit has detected a bearing carbonization failure in the turbine system.

12. A non-transitory computer readable medium, comprising
computer executable instructions stored thereon, which, when executed by a computer, causes the computer to perform the steps of the method according to claim 1.

13. A computer program product comprising:
a non-transitory computer readable medium loaded with computer executable instructions, which, when executed by a computer, causes the computer to perform the steps of the method according to claim 1.

14. The method according to claim 1, further comprising:
transmitting a notification to an operator of a turbine system based on the detected bearing carbonization failure.

15. The method according to claim 1, further comprising:
eliminating a root cause of the bearing carbonization failure in the turbine system.

16. The method according to claim 1, further comprising:
cleaning the carbonized bearing in the turbine system based on the detected bearing carbonization failure.

17. The method according to claim 1, further comprising:
detecting an abnormal turbine shutdown;
eliminating a root cause of the bearing carbonization failure in the turbine system; and
restarting the turbine system after the abnormal turbine shutdown.

18. The method according to claim 1, further comprising:
stopping the turbine for maintenance; and
eliminating a root cause of the bearing carbonization failure in the turbine system.

19. A device for detecting a bearing carbonization failure in a turbine system, the turbine system comprising a bearing, a turbine rotational speed sensor, and a bearing displacement acceleration sensor, the device comprising:
a unit for obtaining individual measurement values from each of the turbine rotational speed sensor and the bearing displacement acceleration sensor,
a unit for determining, as a first condition, whether the measurement values from the rotational speed sensor exceed or equal a first threshold value during a first period of time,
a unit for calculating a characteristic value based on the measurement values from the bearing displacement acceleration sensor corresponding to a second period of time, the second period of time being part of the first period of time,
a unit for determining, as a second condition, whether the calculated characteristic value exceeds a second threshold value, and
a unit for determining that a bearing carbonization failure has occurred if both the first condition and the second condition are fulfilled.

* * * * *